(12) United States Patent
Hyun

(10) Patent No.: US 7,285,880 B2
(45) Date of Patent: Oct. 23, 2007

(54) RECIPROCATING MOTOR

(75) Inventor: Seong-Yeol Hyun, Gyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 403 days.

(21) Appl. No.: 10/494,952

(22) PCT Filed: Sep. 9, 2003

(86) PCT No.: PCT/KR03/01870

§ 371 (c)(1),
(2), (4) Date: May 7, 2004

(87) PCT Pub. No.: WO2004/025814

PCT Pub. Date: Mar. 25, 2004

(65) Prior Publication Data

US 2004/0251749 A1    Dec. 16, 2004

(30) Foreign Application Priority Data

Sep. 10, 2002    (KR) .................. 10-2002-0054718

(51) Int. Cl.
*H02K 41/00*    (2006.01)
(52) U.S. Cl. .......................... 310/23; 310/15
(58) Field of Classification Search ............ 310/12–15, 310/23; 417/417
See application file for complete search history.

(56) References Cited

U.S. PATENT DOCUMENTS

| 2,509,081 A | 5/1950 | Bluth |
| 2,755,698 A | 7/1956 | Wurzel |
| 5,352,079 A | 10/1994 | Croskey |
| 6,838,789 B2 * | 1/2005 | Kwon et al. .................. 310/12 |

FOREIGN PATENT DOCUMENTS

| JP | 09-151923 A | 6/1997 |
| JP | 2001 057767 A | 2/2001 |
| JP | 2001057767 A * | 2/2001 |
| JP | 2001-231239 A | 8/2001 |
| JP | 2001231239 A * | 8/2001 |
| JP | 2002-218727 A | 8/2002 |

* cited by examiner

*Primary Examiner*—Thanh Lam
(74) *Attorney, Agent, or Firm*—Birch, Stewart, Kolasch, and Birch, LLP

(57) ABSTRACT

A reciprocating motor includes: an outer stator (4) in a support frame (2); an inner stator (6) disposed at the inner circumferential surface of the outer stator (4) with a certain air gap and mounted at the outer circumferential surface of a cylinder (16); a magnet (10) disposed to be linearly movable between the outer stator (4) and the inner stator (6) driven by the winding coil (8) due to move the piston (18); and the locking unit (30, 32), installed at the lateral face of the inner stator (6) for preventing the inner stator (6) from moving in an axial direction. Therefore, the reciprocating motor can improve reliability of a motor by preventing an inner stator (6) from moving in an axial direction by vibration caused by linear movement of the magnet (10).

17 Claims, 5 Drawing Sheets

RECIPROCATING MOTOR

TECHNICAL FIELD

The present invention relates to a reciprocating motor and, more particularly, to a reciprocating motor capable of preventing a stator from moving in an axial direction.

BACKGROUND ART

In general, a reciprocating motor includes an outer stator and an inner stator which are disposed with a certain interval therebetween and a magnet frame having a magnet deposed between the outer stator and the inner stator, so that when power is applied to a winding coil wound around the stator, the magnet frame is linearly and reciprocally moved by an interaction of the stator and the magnet frame. The reciprocating motor is commonly used for a reciprocating compressor, and as its piston and the magnet frame are connected, the piston is reciprocally moved.

FIG. 1 is a sectional view of a conventional reciprocating motor, and FIG. 2 is a sectional view taken along line II-II of FIG. 1.

The conventional reciprocating motor includes an outer stator 104 in a cylindrical form with a plurality of thin lamination sheets laminated and a winding coil 102 wound therein, an inner stator 106 disposed at an inner circumferential surface of the outer stator 104 with a certain air gap therebetween and having a cylindrical form with a plurality of thin lamination sheets laminated, a magnet 108 disposed in a circumferential direction between the outer stator 104 and the inner stator 106, and a magnet frame 110, at which a plurality of the magnets 108 are fixed, being connected to a piston 118 to be reciprocally moved.

The piston 118 is disposed in a cylinder 120 and linearly and reciprocally moved according to the operation of the motor, compressing a fluid.

The outer stator 104 is supported by a support frame 124, and a support ring 114 is inserted at both sides thereof in order to maintain the cylindrical form.

Also, the inner stator 106 is fixed at an outer circumferential surface of the cylinder 120 by a press-fit method or an adhesive, and a support ring 116 is inserted at both sides of the inner stator 106 in order to support the plurality of lamination sheets.

The operation of the conventional reciprocating motor will now be described.

When power is applied to the winding coil 102, a flux is formed around the winding coil 102, forming a closed loop along the outer stator 104 and the inner stator 106. The magnet is linearly moved to an axial direction by the interaction of the flux formed between the outer stator 104 and the inner stator 106 and the flux formed by the magnet 108. When the direction of the electric current is changed alternately, the flux direction of the winding coil 102 is changed so that the magnet 108 is linearly and reciprocally moved.

According to the movement of the magnet 108, the magnet frame 110 to which the magnet 108 is fixed is linearly and reciprocally moved, and thus, the piston 118 is linearly and reciprocally moved.

However, the conventional art has a problem that because the inner stator 106 is fixed at the outer circumferential surface of the cylinder 120 by the press-fit method, the inner stator 106 is moved along with the magnet 108 in the axial direction by the vibration generated when the magnet 108 is moved reciprocally.

In addition, in the case that the inner stator 106 is fixed at the outer circumferential surface of the cylinder 120 by the adhesive and so on, an assembly operation is not easy.

DISCLOSURE OF THE INVENTION

Therefore, it is an object of the present invention to provide a reciprocating motor capable of improving reliability of a motor by preventing an inner stator from moving in an axial direction caused by vibration of a linearly moved magnet as the motor is used for a long time.

To achieve the above object, there is provided a reciprocating motor including: an outer stator; an inner stator disposed at an inner circumferential surface of the outer stator with an air gap therebetween and mounted at an outer circumferential surface of a cylinder; a magnet disposed to be linearly movable between the outer stator and the inner stator; and a locking unit installed at the lateral face of the inner stator and preventing the inner stator from moving in an axial direction.

The locking unit includes a locking groove formed at the outer circumferential surface of the cylinder in a circumferential direction and a locking ring inserted into the locking groove and adhered closely at the lateral face of the inner stator.

The locking groove is formed in a way that its one side is at a right angle and the other side narrows inwardly, forming a tilt angle.

An inner side of the locking ring is inserted into the locking groove and an outer side thereof is supported at the lateral face of the inner stator.

In order to achieve the above object, there is also provided a reciprocating motor including: an outer stator; an inner stator disposed at the inner circumferential surface of the outer stator with a certain air gap and disposed at the outer circumferential surface of a cylinder; a magnet disposed to be linearly movable between the outer stator and the inner stator; and a locking unit consisting of a locking groove formed at the outer circumferential surface of the cylinder in a circumferential direction, and a locking ring elastically supported at the locking groove and at the lateral face of the inner stator to prevent the inner stator from moving in an axial direction.

MODES FOR CARRYING OUT THE PREFERRED EMBODIMENTS

A first embodiment of the present invention will now be described with reference to the accompanying drawings.

There can be a plurality of embodiments of the reciprocating motor in accordance with the present invention, and a preferred embodiment will now be described.

Figure 1:
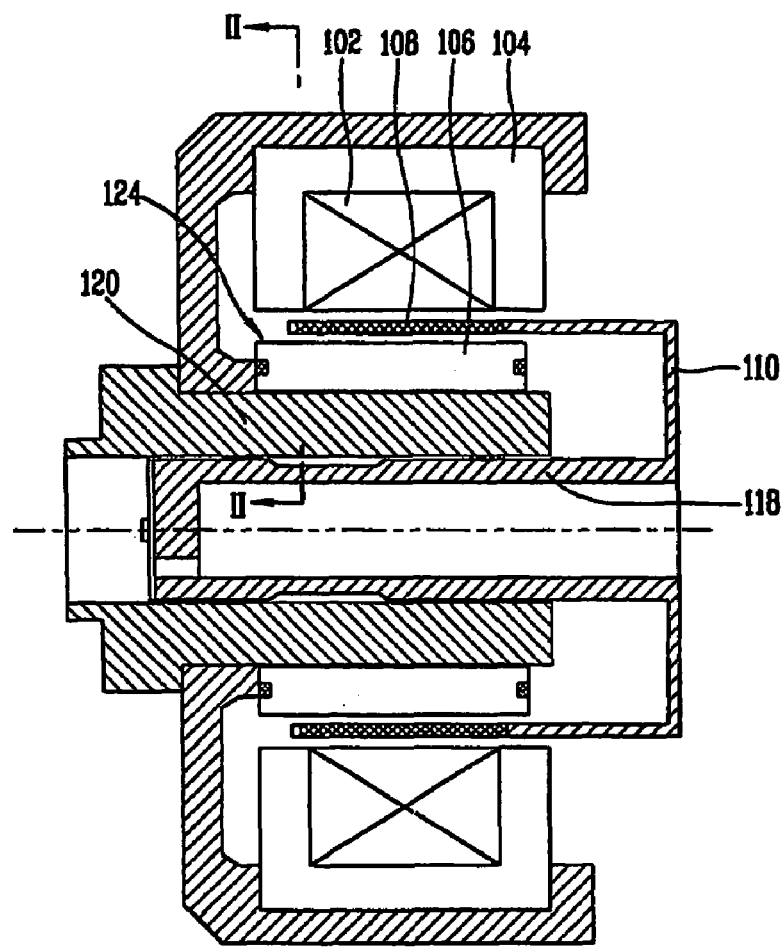
FIG. 1 is a sectional view of a conventional reciprocating motor.
Figure 2:
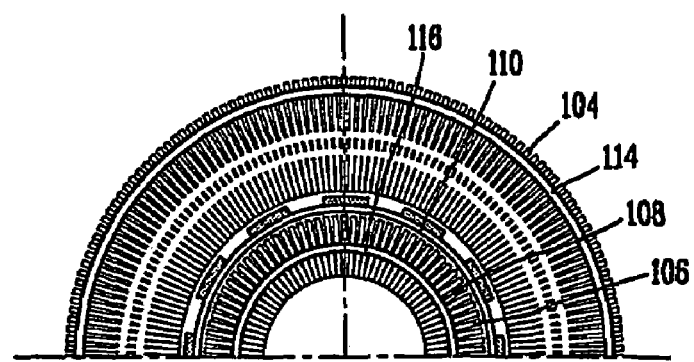
FIG. 2 is a sectional view taken along line II-II of FIG. 1.
Figure 3:
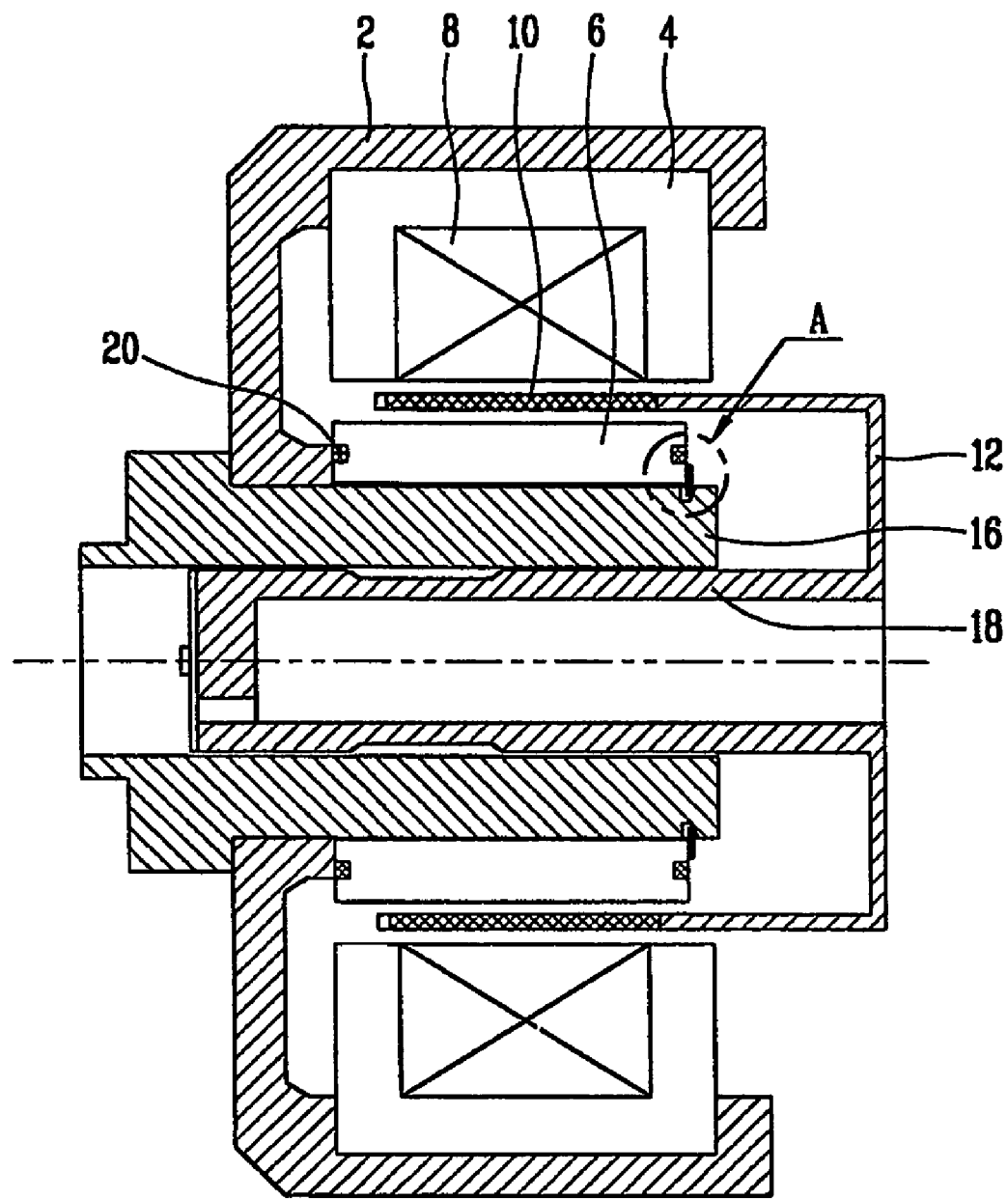
FIG. 3 is a sectional view of a reciprocating motor according to a first embodiment of the present invention.

FIG. 3 is a sectional view of a reciprocating motor according to the present invention.

The reciprocation motor includes: a cylindrical outer stator 4 fixed at a support frame 2; an inner stator 6 disposed at an inner circumferential surface of the outer stator 4 with a certain air gap therebetween and forming a flux therebetween; a winding coil 8 wound in the outer stator 4 or the inner stator 6; a magnet 10 disposed to be linearly movable between the outer stator 4 and the inner stator 6; a magnet frame 12 connected between the magnet 10 and an element desired to be reciprocally moved and transferring a reciprocal movement of the magnet 10 to the element; and a locking unit for preventing the inner stator 6 from moving in an axial direction.

In case that the reciprocating motor is applied to a reciprocating compressor, the element is a piston 18, for example, which is moved linearly and reciprocally in the cylinder 16 for a compressing operation.

The outer stator 4 has a cylindrical form as a plurality of lamination sheets are laminated radially in the circumferential direction, and is supported by the support frame 2.

The inner stator 6 has a cylindrical form with a plurality of lamination sheets laminated radially in the circumferential direction, has a support ring 20 inserted at both sides to support the lamination sheets, and is mounted at the outer circumferential surface of the cylinder 16.

That is, the inner circumferential surface of the inner stator 6 is mounted at the outer circumferential surface of the cylinder 16. One side of the inner stator 6 is supported by the support frame 2 or a protruded portion of the cylinder 16, and the other side is supported by the locking unit which prevents the inner stator 6 from moving in an axial direction.

Figure 4:
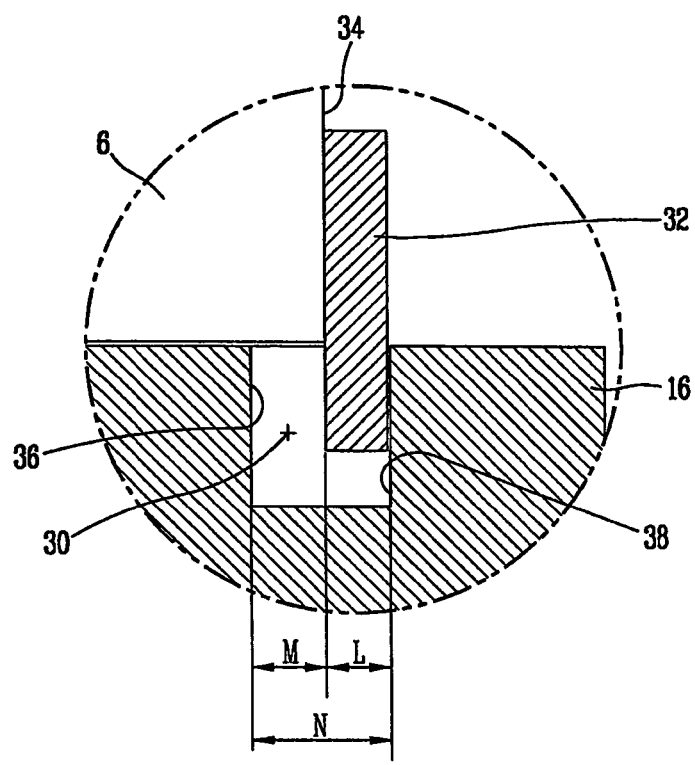
FIG. 4 is an enlarged view of a part 'A' of FIG. 3 showing a locking unit of an inner stator according to the first embodiment of the present invention.

As shown in FIG. 4, the locking unit includes a locking groove 30 formed at the outer circumferential surface of cylinder 16 in a circumferential direction and a locking ring 32 inserted into the locking groove 30 and adhered closely to the lateral face 34 of the inner stator 6.

The locking groove 30 is formed at the outer circumferential surface of the cylinder 16 in the circumferential direction with a certain width and depth, and has a greater width (N) than a thickness (L) of the locking ring 32 so that the locking ring 32 can be easily inserted thereinto. That is, the width (N) of the locking groove 30 is the sum of the thickness (L) of the locking ring 32 and the inward width (M) from the lateral face 34 of the inner stator 6.

Figure 5:
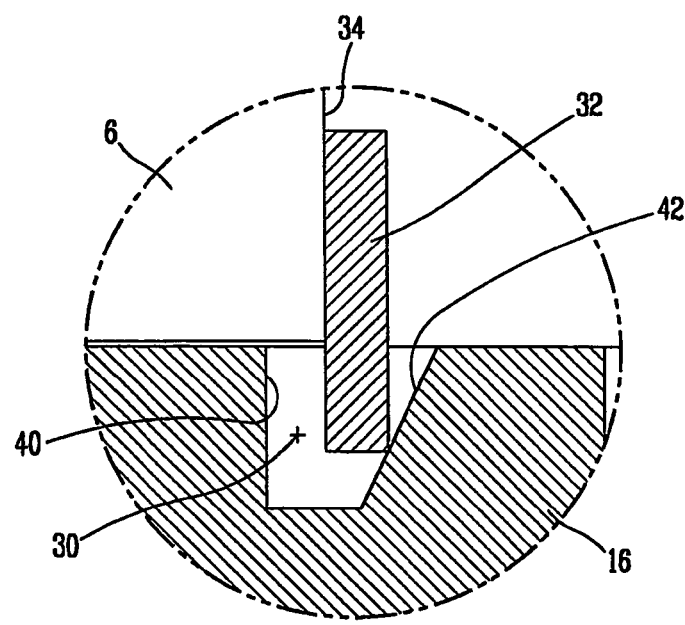
FIG. 5 is a sectional view of another case of the locking groove of the locking unit in accordance with the present invention.

As shown in FIG. 4, the locking groove 30 is formed such that both sides 36 and 38 are at a right angle, or such that, as shown in FIG. 5, one side 40 is at a right angle and the other surface 42 is at a tilt angle, forming a slant surface with the width of the locking groove 30 becoming narrow inwardly.

In the case that the locking groove 30 has the slant surface, it is easy to insert the locking ring 32, so that the assembling is convenient.

Figure 6:
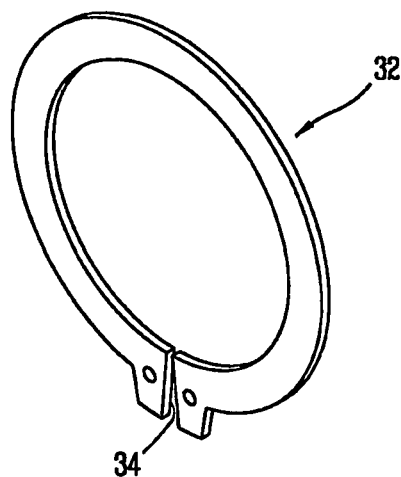
FIG. 6 is a perspective view of a locking ring according to the first embodiment of the present invention.

As shown in FIG. 6, the inner surface of the locking ring 32 is adhered closely to the side of the locking groove 30 and its outer surface is supported at the lateral face 34 of the inner stator 6. And, an opening portion 34 is formed at the one side of the locking ring 32 to facilitate assembling and has a certain elastic force in the opening direction. That is, in assembling after the opening portion 34 is opened, the locking ring 32 is inserted into the locking groove 30.

The locking ring is formed so that its right and left portions are asymmetrical centering on the opening portion, and is formed so that its right and left portions are asymmetrical centering on the opening portion. Also, at least one of the locking rings is disposed at the locking groove.

The operation of the reciprocating motor according to the present invention will now be described.

When power is applied to the winding coil 8, a flux is formed around the winding coil 8, forming a closed loop along the outer stator 4 and the inner stator 6. The magnet 10 is linearly moved in an axial direction by the interaction of the flux formed between the outer stator 4 and the inner stator 6 and the flux formed by the magnet 10.

Also, when the direction of the electric current applied to the winding coil 8 is alternately changed, the flux direction of the winding coil 8 is changed so that the magnet 10 is linearly and reciprocally moved.

Then, as the magnet frame 12 with the magnet 10 fixed thereto is linearly and reciprocally moved, an element such as the piston 18 is linearly reciprocally moved.

At this time, the locking unit prevents the inner stator 6 disposed at the outer circumferential surface of the cylinder 16 from moving in the axial direction which is caused by the vibration generated during the linear and reciprocating movement of the magnet 10.

That is, the axial movement of the inner stator 6 in the axial direction is prevented because the locking ring 32 is adhered closely to the lateral face 34 of the inner stator 6 in a state of being inserted in the locking groove 30 formed at the outer circumferential surface of the cylinder 16.

Figure 7:
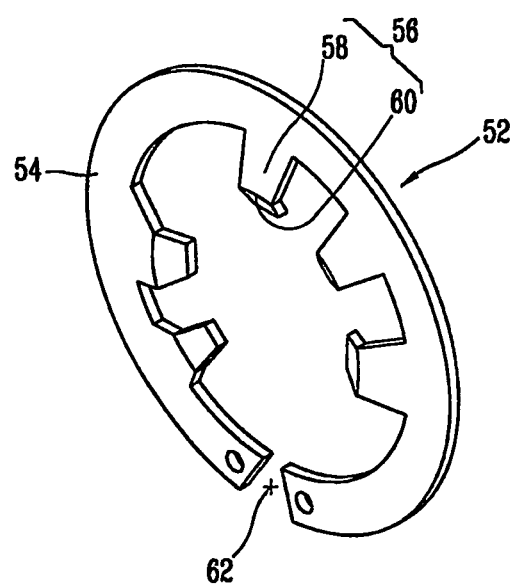
FIG. 7 is a perspective view of a locking ring of a locking unit according to a second embodiment of the present invention.
Figure 8:
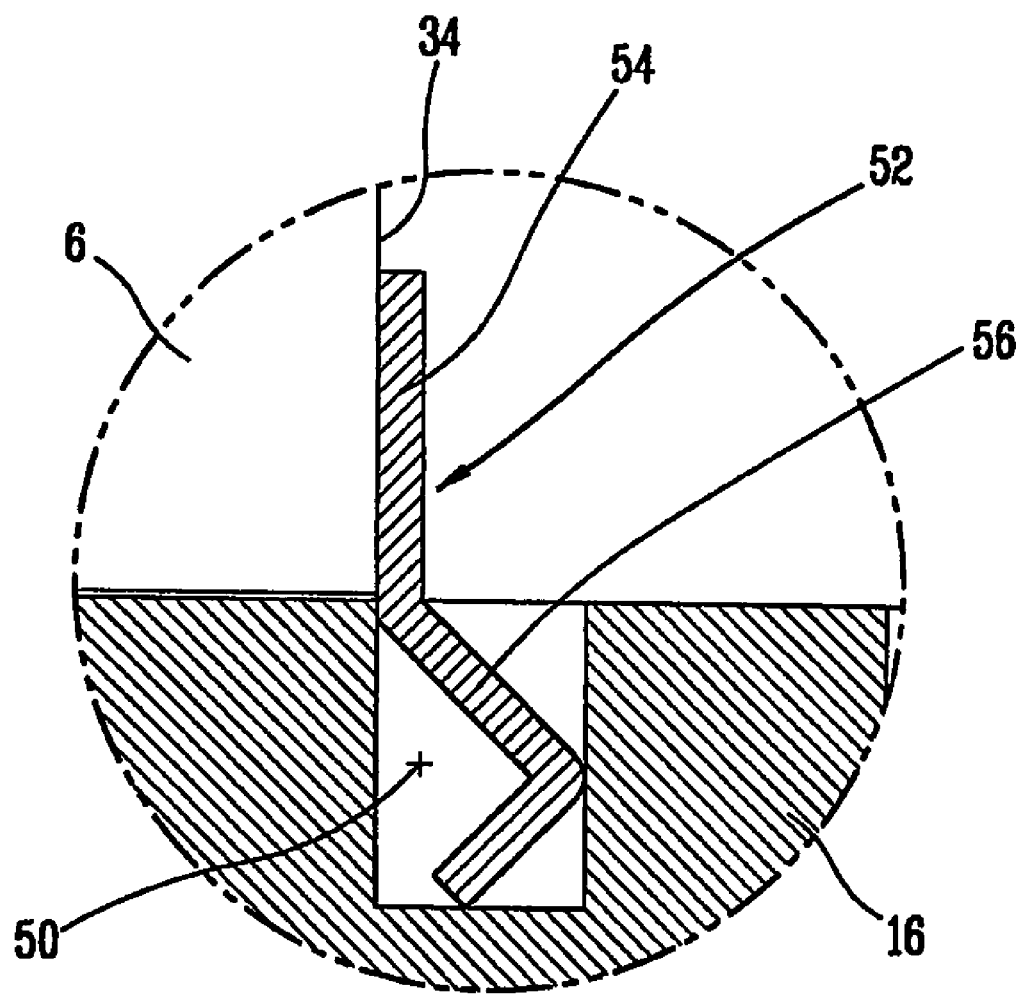
FIG. 8 is a sectional view of a locking unit according to the second embodiment of the present invention.

FIG. 7 is perspective view of the locking ring of a locking unit according to a second embodiment of the present invention, and FIG. 8 is a sectional view of a locking unit according to the second embodiment of the present invention.

A locking unit according to the second embodiment of the present invention includes a locking groove 50 formed at an outer circumferential surface of the cylinder 16 in the circumferential direction, and a locking ring 52 elastically supported in the locking groove 50 and at the lateral face 34 of the inner stator 6 and preventing the inner stator 6 from moving in the axial direction.

one side of the locking groove 50 is positioned on the same straight line as the lateral face 34 of the inner stator 6, and the locking groove 50 is formed to have a greater width than a thickness of the locking ring 52.

The locking ring 52 includes a ring portion 54 supported at the lateral face 34 of the inner stator 6 and having an opening portion 62 at the one side thereof and an elastic support portion 56 extended with a certain interval inwardly from the inner circumferential surface of the ring portion 54 so as to be elastically supported in the locking groove 50.

Herein, the elastic support portion 56 includes a first support portion 58 extended at a certain tilt angle inwardly from the ring portion 54, and a second support portion 60 bent at a certain angle from the first support portion 58 so as to provide an elastic force in such a direction that the first support portion 58 and the second support portion 60 are smoothed.

The locking unit according to the second embodiment prevents the inner stator 6 from moving in the axial direction since the ring portion 54 of the support ring 52 is adhered closely to the lateral face 34 of the inner stator 6 and the elastic support portion 56 is elastically supported at the locking groove 50 of the cylinder 16.

As described above, the reciprocating motor in accordance with the present invention can improve reliability of the motor by preventing the inner stator from moving in the axial direction in the way of forming the locking groove at the outer circumferential surface of the cylinder, inserting the locking ring into the locking groove and supporting the locking ring at the lateral face of the inner stator.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A reciprocating motor comprising:
    an outer stator;
    an inner stator disposed at an inner circumferential surface of the outer stator with a certain air gap therebetween and at an outer circumferential surface of a cylinder;
    a magnet disposed to be linearly movable between the outer stator and the inner stator; and
    a locking unit installed at a side of the inner stator for preventing the inner stator from moving in an axial direction,
    wherein the locking unit includes a locking groove formed at the outer circumferential surface of the cylinder in the circumferential direction and a locking ring inserted in the locking groove and adhered closely to the side of the inner stator.

2. The reciprocating motor of claim 1, wherein the locking groove is formed such that both sides are a right angle.

3. The reciprocating motor of claim 1, wherein the locking ring comprises:
    a ring portion supported at the side of the inner stator; and
    an elastic support portion extended with a certain interval inwardly from the inner circumferential surface of the ring portion.

4. The reciprocating motor of claim 3, wherein the elastic support portion comprises:
    a first support part extended at a certain tilt angle inwardly from the ring portion; and
    a second support portion bent at certain angle from the first support portion so as to provide an elastic force.

5. The reciprocating motor of claim 1, wherein the locking ring has an opening portion, and a certain elastic force is generated when the opening portion is opened.

6. The reciprocating motor of claim 5, wherein the locking ring is formed so that its right and left portions are asymmetrical centering on the opening portion.

7. The reciprocating motor of claim 5, wherein the locking ring is formed so that its thickness becomes thicker, as it goes from the opening portion toward an opposite portion of the opening portion.

8. The reciprocating motor of claim 1, wherein the locking groove has a width greater than a thickness of the locking ring.

9. The reciprocating motor of claim 8, wherein the inner stator partially overlaps the locking groove.

10. The reciprocating motor of claim 9, wherein the width of the locking groove is substantially equal to a sum of the thickness of the locking ring and an amount the inner stator partially overlaps the locking groove.

11. The reciprocating motor of claim 1, wherein the locking groove is formed at only one side of the inner stator for receiving the inserted locking ring.

12. A reciprocating motor comprising:
    an outer stator;
    an inner stator disposed at an inner circumferential surface of the outer stator with a certain air gap therebetween and at an outer circumferential surface of a cylinder;
    a magnet disposed to be linearly movable between the outer stator and the inner stator; and
    a box-shaped locking groove formed in the outer circumferential surface of the cylinder and configured to receive a locking member to prevent the inner stator from moving in an axial direction across the circumferential surface of the cylinder,
    wherein the inner stator partially overlaps the box-shaped locking groove.

13. The reciprocating motor of claim 12, wherein the locking member is a locking ring.

14. The reciprocating motor of claim 12, wherein the locking ring has an opening portion, and a certain elastic force is generated when the opening portion is opened.

15. The reciprocating motor of claim 12, wherein the locking groove has a width greater than a thickness of the locking ring.

16. The reciprocating motor of claim 15, wherein the width of the locking groove is substantially equal to the sum of the thickness of the locking ring and an amount the inner stator partially overlaps the locking groove.

17. The reciprocating motor of claim 12, wherein the locking groove is formed at only one side of the inner stator for receiving the inserted locking ring.

* * * * *